United States Patent Office 3,396,301
Patented Aug. 6, 1968

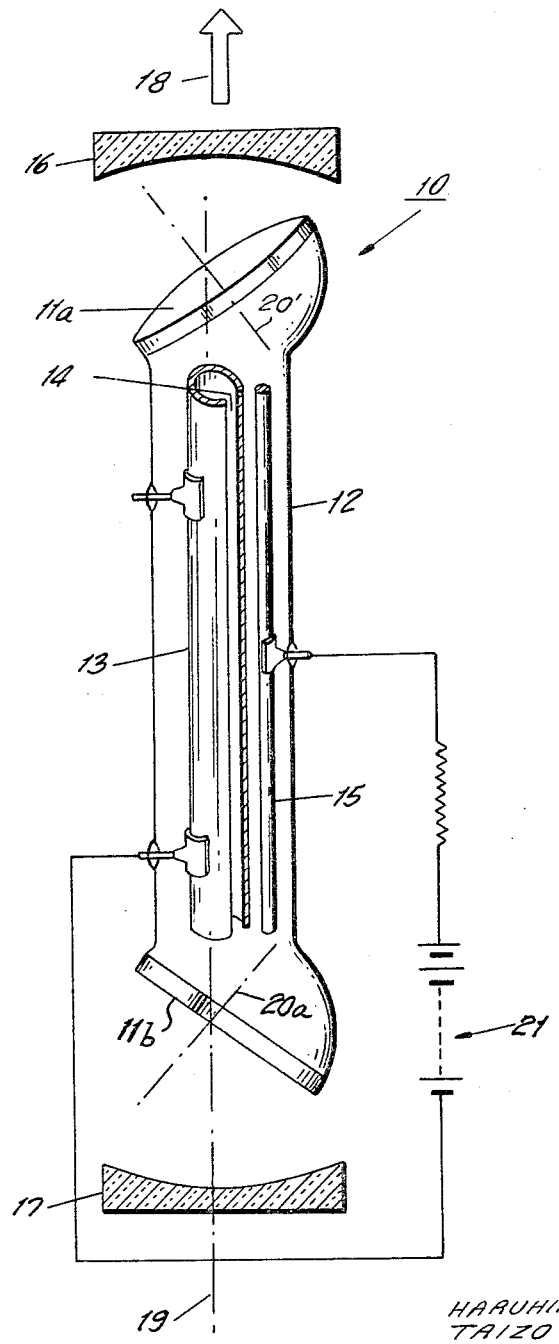

3,396,301
GAS LASER TUBE HAVING A HOLLOW
ELONGATED CATHODE ELECTRODE
Haruhiro Kobayashi and Taizo Oikado, Tokyo, Japan, assignors to Nippon Electric Company Limited, Tokyo, Japan, a corporation of Japan
Filed Apr. 7, 1965, Ser. No. 446,167
Claims priority, application Japan, Apr. 20, 1964, 39/23,091
7 Claims. (Cl. 313—210)

ABSTRACT OF THE DISCLOSURE

A gas laser tube having elongated cathode and anode electrodes to greatly enhance the laser output. The cathode electrode is substantially cylindrical in shape and is provided with a slit running its entire length and being substantially perpendicular to the longitudinal axis of the cathode. The anode is a slender, elongated wire or rod shaped electrode arranged substantially parallel to the cathode longitudinal axis and spaced by a distance substantially equal to the inner diameter of the cylindrical shaped cathode so as to be positioned within the elongated slit provided in the cathode. The electrodes provide a strong glow discharge which is uniform over the entire length of the cathode member.

The instant invention relates to gas laser tubes and, more particularly, to a novel gas laser tube structure having a simple, efficient configuration yielding an extremely powerful laser output.

Present day gas laser structures which employ hollow cathode glow discharge means as an amplifying medium have various advantageous characteristics, among these being ease of construction and handling. Conventional gas laser structures of this type are comprised of a ring shaped anode electrode which is positioned a spaced distance from and in coaxial alignment with the longitudinal axis of a tubular shaped cathode. One typical example of such a structure is set forth in Japanese patent application No. 21835/1963 issued as British Patent No. 1,013,725. Hollow cathode glow discharge structures of this type are characterized in that each point within the tubular cathode is at a different distance from the anode, resulting in unsatisfactory performance of the structure due to the fact that a strong glow discharge is produced only in the interior portion in the immediate vicinity of the tubular cathode and the glow discharge is very non-uniform throughout the glow region.

The instant invention relates to an electrode structure for gas laser tubes which eliminates the above mentioned defects and is designed to provide an extremely uniform and strong glow discharge over the entire interior surface of the tubular cathode.

The gas laser tube of the instant invention is comprised of a hollow, elongated cathode member having an elongated slit substantially parallel to the cathode longitudinal axis with the slit running the entire length of the cathode member. A thin rod or wire shaped anode is positioned within the slit and substantially in alignment with the cathode longitudinal axis. During operation, the cathode, which is of the cold cathode type, cooperates with the anode to provide an extremely strong glow discharge which is uniform over the entire length of the cathode member. The unique design permits the use of a voltage source which is of the order of 200 volts, whereas conventional gas laser tubes require voltage sources of greater than 1500 volts. The gas laser tube structure of the instant invention thereby provides a simple, efficient arrangement for producing an extremely uniform glow discharge and powerful laser output, with substantially diminished voltage source requirements.

It is, therefore, one primary object of the instant invention to provide a gas laser tube having a configuration which yields an efficient and powerful laser output light.

Another object of the instant invention is to provide a novel electrode structure for gas laser tubes and the like employing an elongated hollow tubular cathode member having an elongated slit substantially in alignment with its longitudinal axis for receiving a thin anode electrode within said slit to produce a powerful and uniform glow discharge.

These and other objects of the instant invention will become apparent upon consideration of the accompanying description and drawing in which:

The sole figure is a perspective view showing a hollow cathode glow discharge gas laser tube designed in accordance with the principles of the instant invention.

The drawing depicts a gas laser tube 10 which is comprised of a tubular electrode member 13 which is formed of a suitable metal such as tantalum and preferably has a 5 mm. inner diameter and a lenght of 20 cm. Tubular electrode 13 forms the hollow cathode element for the gas laser tube 10. A longitudinal portion of hollow cathode 13 is cut away in a direction substantially in alignment with tubular axis 19, forming a slit 14 along the entire length of the cathode 13. A thin wire or rod shaped anode 15 is mounted within said slit 14 and in axial alignment with axis 19. The anode 15 is preferably of the same length as cathode member 13. While the sole figure depicts anode 15 as being somewhat removed from the region of slit 14, it should be understood that this exaggerated showing is for purposes of clarity and that the anode is preferably spaced from the axis 19 by a distance substantially equal to the cathode inner radius.

The anode 15 and the cathode 13 electrodes are sealed in an air-tight manner within a vessel or envelope 12, preferably made of glass. The envelope 12 of the gas laser tube is preferably filled with a suitable gas such as, for example, a gas mixture of helium and neon of preselected percentages and amounts.

The opposite ends 11a and 11b of envelope 12 are formed of a transparent material suitable for lased oscillating light. The ends 11a and 11b form windows comprised of well polished plates which are fused to vessel 12 in such a manner that a perpendicular axis 20 and 20a to each of said plates 11a and 11b, respectively, maintains Brewster's polarization angle A with respect to the axis 19 of tubular cathode 13, with the polarization angle being determined by the equation $\tan A = n$. In this equation $n$ represents the index of refraction of plates 11a and 11b for the laser light.

A pair of reflectors 16 and 17 are arranged at opposite ends of tube structure 10 adjacent the plates 11a and 11b.

The reflectors are chosen in such a manner that the reflectivity of reflectors 16 and 17 for laser light are 99% and 100%, respectively. The distance between reflectors 16 and 17 is less than the sum of the radius of curvature of both reflectors except for the length between both curvature radii.

In order to initiate an electron discharge a voltage of approximately 200 volts D.C. is applied between cathode 13 and wire anode 15 by voltage source 21. Once the current in the gas laser tube 10 is increased over approximately 200 ma., a relatively intense plasma, commonly referred to as the hollow cathode glow discharge, spreads along the entire length of cathode 13. The relative positions of the anode 15 and cathode 13, being uniform in the axial direction, yields a glow discharge which is uniform over the entire length of cathode 13.

The helium atoms, which are excited to a $2^3S$ energy level by the electrons in the glow discharge plasma, act upon the neon atoms to produce an inversion of excitation atom density between energy levels of neon 2S and 2P, causing laser oscillations to occur at a wave length of approximately 1.15 microns, which correspond to the difference between the two above mentioned energy levels, thereby yielding output light 18 through the reflector member 16.

Such oscillations are obtainable even with light wave lengths of 3.39 microns or 0.633 micron by replacing reflectors 16 and 17 with reflectors having the above mentioned reflectivity characteristics (99% and 100%, respectively) at the operating wave length (or wave lengths) desired.

It is also possible to obtain laser output light having wave lengths other than those mentioned above through the use of any of the inert gases, such as helium, neon, argon, krypton, xenon, and the like, used either alone or in mixtures of two or more of said inert gases. Due to the unique structure of the gas laser tube described herein, it is not necessary to employ a high frequency electric power source or a high voltage D.C. power source of 1500 volts or more, as is required for conventional gas laser tube structures. Also, heater power sources of the type employed in conventional gas laser generating devices are not needed in the structure of the instant invention. In accordance with the instant invention, it is thereby possible to provide an economical laser device, since the laser output is obtained through the use of a low voltage electric source of only several hundred volts. In addition thereto, the novel construction of the hollow cathode 13 and anode 15 permits efficient use of the entire interior surface of tubular cathode 13, yielding an efficient, uniform, stabilized and powerful laser light output.

While the preferred embodiment herein has been shown for use with a D.C. voltage source, it should be understood that the structure is also suited for pulse operation. Due to the fact that a cold cathode structure is employed, there is no danger of damage to the electrodes by a large pulse current, and powerful pulse oscillations occurring within short time intervals are permissible with the tube structure of the instant invention. In addition, an extremely fine wire or rod may be inserted within slit 14 to serve as the anode member 15.

Although there has been described a preferred embodiment of this novel invention, many variations and modifications will now be apparent to those skilled in the art. Therefore, this invention is to be limited, not by the specific disclosure herein, but only by the appended claims.

What is claimed is:

1. An electrode structure for use in gas laser tubes comprising:
    an elongated envelope;
    anode and cathode electrodes positioned within said envelope;
    said cathode electrode being a hollow elongated metallic member open at both ends thereof and having its longitudinal axis substantially in alignment with the axis of said elongated envelope;
    said hollow member having a slit extending the entire length of said hollow member;
    said anode electrode being an elongated rod shaped member positioned in spaced parallel fashion to the longitudinal axis so as to be positioned within said slit;
    said electrode arrangement providing a uniform powerful hollow cathode glow discharge.

2. An electrode structure for use in gas laser tubes comprising:
    an elongated envelope;
    anode and cathode electrodes positioned within said envelope;
    said cathode electrode being a hollow elongated metallic member of the cold cathode type open at both ends thereof and having its longitudinal axis substantially in alignment with the axis of said elongated envelope;
    said hollow member having a slit extending substantially the entire length of said hollow member;
    said anode electrode being an elongated rod shaped member positioned in spaced parallel fashion to the longitudinal axis so as to be positioned within said slit;
    said electrode arrangement providing a uniform, powerful hollow cathode glow discharge.

3. An electrode structure for use in gas laser tubes comprising:
    an elongated envelope;
    anode and cathode electrodes positioned within said envelope;
    said cathode electrode being a hollow elongated metallic member of the cold cathode type open at both ends thereof and having its longitudinal axis substantially in alignment with the axis of said elongated envelope;
    said hollow member having a slit extending substantially the entire length of said hollow member;
    said anode electrode being an elongated fine wire positioned in spaced parallel fashion to the longitudinal axis so as to be positioned within said slit;
    said electrode arrangement providing a uniform, powerful hollow cathode glow discharge.

4. An electrode structure for use in gas laser tubes comprising:
    an elongated envelope;
    anode and cathode electrodes positioned within said envelope;
    said cathode electrode being a hollow elongated metallic member open at both ends thereof and having its longitudinal axis substantially in alignment with the axis of said elongated envelope;
    said hollow member having a slit extending the entire length of said hollow member;
    said anode being a substantially straight member substantially in spaced parallel alignment with the cathode longitudinal axis so as to lie within said slit;
    said electrode arrangement providing a uniform, powerful hollow cathode glow discharge.

5. An electrode structure for use in gas laser tubes comprising:
    an elongated envelope;
    anode and cathode electrodes positioned within said envelope;
    said cathode electrode being a hollow elongated metallic member open at both ends thereof and having its longitudinal axis substantially in alignment with the axis of said elongated envelope;
    said hollow member having a slit extending substantially the entire length of said hollow member;
    said anode being a substantially straight member substantially in spaced parallel alignment with the cathode longitudinal axis so as to lie within said slit and being substantially equal in length to said cathode electrode;

said electrode arrangement providing a uniform, powerful hollow cathode glow discharge.

6. The structure of claim 1 wherein said cathode member has a substantially annular cross-section.

7. The structure of claim 1 wherein said cathode member has a substantially circular cross-section.

References Cited
UNITED STATES PATENTS

| | | | |
|---|---|---|---|
| 3,304,456 | 2/1967 | De Lany et al. | 313—356 X |
| 1,991,426 | 2/1935 | Simons | 313—210 X |
| 3,149,290 | 8/1964 | Bennett, et al. | 331—94.5 |
| 3,242,439 | 3/1966 | Rigden et al. | 313—226 X |

JAMES W. LAWRENCE, *Primary Examiner.*

R. L. JUDD, *Assistant Examiner.*